(12) United States Patent
Montgomery

(10) Patent No.: US 6,874,580 B2
(45) Date of Patent: Apr. 5, 2005

(54) METHOD FOR ENHANCING WELL PRODUCTIVITY

(75) Inventor: Carl T. Montgomery, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 26 days.

(21) Appl. No.: 10/280,938

(22) Filed: Oct. 25, 2002

(65) Prior Publication Data
US 2004/0206506 A1 Oct. 21, 2004

(51) Int. Cl.[7] ............................................. E21B 43/22
(52) U.S. Cl. ....................... 166/307; 166/311
(58) Field of Search ................. 166/307, 304, 166/300, 305.1, 311, 312

(56) References Cited

U.S. PATENT DOCUMENTS

| | | | | |
|---|---|---|---|---|
| 3,347,789 A | * | 10/1967 | Dickson et al. | 166/305.1 |
| 3,517,745 A | * | 6/1970 | Suman, Jr. | 166/297 |
| 3,578,080 A | * | 5/1971 | Closmann | 166/248 |
| 3,967,853 A | | 7/1976 | Closmann et al. | |
| 4,372,384 A | * | 2/1983 | Kinney | 166/278 |
| 5,249,844 A | | 10/1993 | Gronseth | |
| 5,685,374 A | | 11/1997 | Schmidt et al. | |
| 5,853,224 A | | 12/1998 | Riese | |
| 5,881,813 A | * | 3/1999 | Brannon et al. | 166/304 |
| 6,024,171 A | | 2/2000 | Montgomery et al. | |
| 6,637,517 B2 | * | 10/2003 | Samuel et al. | 166/381 |

OTHER PUBLICATIONS

Gatlin, Petroluem Engineering, Prentice–Hall, Inc. 1960, pp321–327.*

Williams, Acidizing Fundamentals, Society of Petroleum Engineers of AIME, 1979, pp1–18.*

* cited by examiner

Primary Examiner—Frank Tsay
(74) Attorney, Agent, or Firm—Kameron D. Kelly

(57) ABSTRACT

A method for enhancing the productivity of a subterranean well comprising passing a solvent out of a string of production casing through perforations proximate an unfractured soluble formation, dissolving a region of the soluble formation to create a cavity therein, and increasing the size of the cavity until the subterranean formation proximate the cavity collapses.

20 Claims, 1 Drawing Sheet

METHOD FOR ENHANCING WELL PRODUCTIVITY

BACKGROUND OF THE INVENTION

1. Field of the Invention

Figure 1:
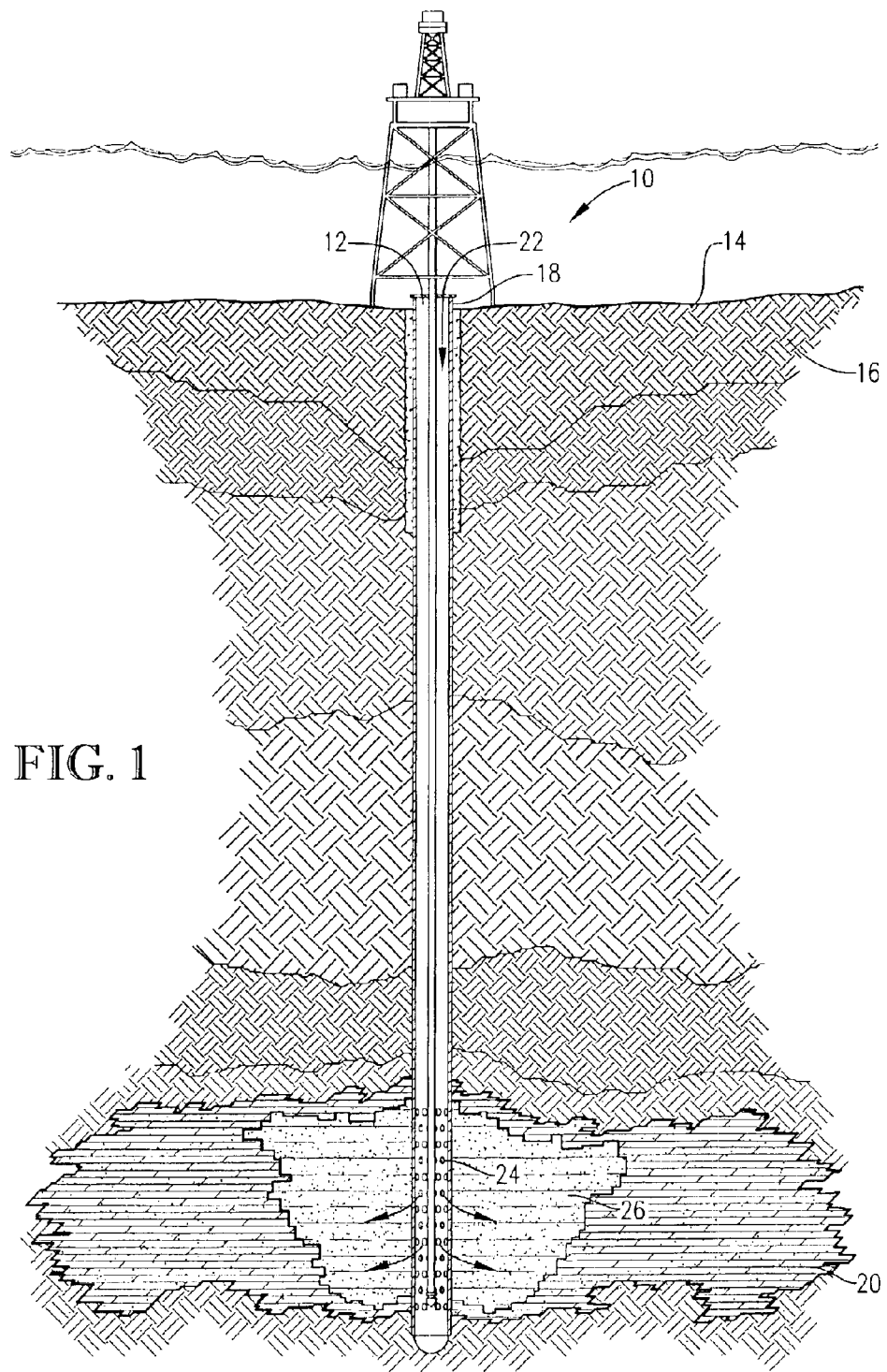

The invention pertains to a method for enhancing the productivity of subterranean wells, namely oil and gas wells. The method generally involves passing a solvent down the well bore and through perforations in the well casing in order to dissolve a soluble portion of a subterranean formation and create a cavity. The size of the cavity is increased until the shear forces exerted on the cavity by the overlaying subterranean formations cause the cavity to collapse.

2. Description of the Prior Art

A number of methods are known in the art for enhancing the productivity of subterranean wells. One conventional method is commonly referred to as acid fracturing. Acid fracturing employs a non-reactive fracturing fluid, or "pad," to fracture the producing subterranean formation. Typically, the pad is a viscous water-based fluid comprising a cross-linked polymer. Once the fracture is made, acid (typically about 28% HCl by volume) is introduced into the subterranean formation and etches the face of the fracture. This etching creates greater conductivity within the formation allowing for flow back to the well bore once the fracture closes back down. While this method has proven to enhance well productivity, it has a number of drawbacks. For example, acid fracturing requires injection of multiple fluids into the well in addition to using highly concentrated acid. Furthermore, the conventional acid fracturing process is unsuitable for use in softer rock formations such as chalk because the rock strength is typically inadequate to support the etched fracture face at the in-situ reservoir closure stresses and pore pressures. This problem is further compounded by "water weakening" of the rock. Water weakening occurs when certain formations, such as chalk, are exposed to water. Generally, chalk having a porosity of 36% will have only ⅙ the strength after being exposed to water. This water weakening occurs immediately and is irreversible. The combination of water weakening, closure stress and pore pressure effects cause the etched rock face to collapse immediately and lose any induced fracture conductivity.

OBJECTS AND SUMMARY OF THE INVENTION

It is, therefore, an object of the present invention to provide a method for enhancing the productivity of a subterranean well by increasing the conductivity of the producing formation. Other objects and advantages of the invention will be apparent from the detailed description of the preferred embodiment, the drawings, and the claims.

In accordance with one embodiment of the present invention, a method of enhancing the productivity of a subterranean well is provided. The subterranean well includes a string of production casing extending generally downward into a subterranean formation. The casing is perforated at a location adjacent an unfractured soluble portion of the subterranean formation. The method generally comprises passing a solvent out of the casing through the perforations and into the unfractured soluble portion of the formation thereby dissolving a region of the soluble portion to create a cavity therein. The size of the cavity is increased until the subterranean formation proximate the cavity collapses.

In accordance with another embodiment of the present invention, a well completion method is provided. The method generally comprises setting a string of production casing in a well bore of a subterranean formation, perforating the casing adjacent a soluble portion of the subterranean formation, pumping a solvent down the casing and out of the casing through the perforations, contacting the solvent with the soluble portion thereby dissolving a region of the soluble portion and creating a cavity therein, and causing the cavity to collapse.

In accordance with still a further embodiment of the present invention, a method of enhancing the productivity of a subterranean well is provided. The well includes a string of production casing extending generally downward into a subterranean formation. The casing is perforated at a location adjacent a soluble portion of the subterranean formation. An acidic solvent is passed out of the casing through the perforations thereby removing well skin located adjacent the soluble portion. After skin removal, acidic solvent continues to pass out of the casing through the perforations thereby dissolving a region of the soluble portion to create a cavity therein. The size of the cavity is increased until the subterranean formation proximate the cavity collapses.

BRIEF DESCRIPTION OF THE DRAWING FIGURES

Preferred embodiments of the invention are described in detail below with reference to the attached drawing figure, wherein:

FIG. 1 is a schematic view of an off-shore well and underlying subterranean formations including a soluble formation having a cavity formed therein due to passage of a solvent down the well bore and into the formation through perforations in the well casing.

DETAILED DESCRIPTION OF THE PREFERRED EMBODIMENT

Turning initially to FIG. 1, a completed off-shore well 10 is shown comprising a well bore 12 extending from a sea floor 14 through layered subterranean formations 16. Well bore 12 is lined with a casing 18 and extends through an unfractured soluble portion 20 of formations 16. As used herein, "unfractured portion" refers to a portion of a subterranean formation that has never been subjected to fracturing operations, or portions of a formation which have not been subjected to fracturing operations within the previous six months. Preferably, the soluble portion of the subterranean formation comprises a carbonate formation. The term "carbonate formation" refers to any formation which comprises primarily (i.e., greater than 50% by weight) carbonate minerals (i.e., minerals in which the basic building block is a carbon atom bonded to three oxygen atoms). More preferably, the carbonate formation is formed primarily of a material selected from the group consisting of chalk, aragonite, limestone, dolomite, carbonate cemented sandstones, and combinations thereof. In another embodiment, unfractured soluble portion 20 may comprise primarily a water soluble formation such as halite. In a further embodiment, unfractured unsoluble portion 20 may comprise primarily an acid soluble sandstone formation. A portion of casing 18 proximate unfractured soluble portion 20 is perforated to enable materials flowed down well bore 12 to be contacted with soluble formation 20.

Prior to treatment according to the present invention, well 10 was generally characterized by low production. Therefore, well 10 is shown undergoing treatment according to the present invention to enhance overall well productivity. Treatment of well 10 generally comprises flowing a solvent (represented by an arrow 22) down well bore 12. The particular solvent employed is chosen based upon the composition of soluble portion 20 of formation 16. If soluble portion 20 comprises a carbonate formation, the solvent comprises an acid. Preferably, the acid is selected from the group consisting of hydrochloric acid, C1–C12 carboxylic acids, and mixtures thereof. The acid concentration to be used with the present invention will generally be less than the concentration of acid typically used in the classical acid fracturing method. Preferably, the solvent used with the present invention has an acid concentration of less than about 25% acid by volume, more preferably less than about 20% by volume, still more preferably less than 15% by volume, and most preferably between about 5–15% by volume. It is possible to employ solvents having an acid concentration of less than 5% by volume, however, the weaker the acid concentration, the greater volume of solvent that which will likely be needed. Hydrochloric acid at a concentration of between about 5–15% is most preferred when soluble portion 20 comprises a carbonate formation. In wells in which soluble portion 20 comprises primarily a water soluble formation, water is the preferred solvent. If soluble portion 20 is primarily sandstone, hydrofluoric acid is the preferred solvent.

Upon injection into well 10, solvent 22 flows through casing perforations 24 and into soluble portion 20. As solvent 22 is continuously passed into soluble portion 20, solvent 22 dissolves portions of soluble portion 20 thereby forming a cavity 26. Solvent 22 continues to be flowed down well bore 12 and into soluble portion 20 until cavity 26 has become sufficiently large so that the shear forces exerted on the soluble portion 20 by overlaying formations 16 cause cavity 26 to undergo shear failure and collapse. Upon cavity collapse, the overall conductivity of soluble portion 20 increases.

Although not wishing to be bound by theory, it is believed that the increase in formation conductivity is attributable to, at least in part, the dilatancy of soluble portion 20. Generally, dilatancy is the property of rock to expand. In consolidated rock formations, the expansion is a result of the creation of microfractures. Unconsolidated rock formations, which are characterized in having a large number of grain contacts, expand by readjusting grain positions to those positions resulting in fewer contacts. Therefore, upon collapse of cavity 26, it is believed that the dilatancy of soluble portion 20 results in increased formation conductivity and thereby provides for enhanced flow to well bore 12 and, correspondingly, increased petroleum recovery.

In addition to being useful for enhancing production in existing subterranean wells, the present invention may also be used in well completion operations. In another embodiment of the invention, a string of production casing 18 is set into a well bore 12 of a subterranean formation 16. The casing adjacent a soluble portion 20 of the subterranean formation is perforated and a solvent 22 is flowed down well bore 12 and out of casing 18 through the perforations 24. Solvent 22 is contacted with soluble portion 20 thereby dissolving a region thereof and creating a cavity 26 therein. Cavity 26 is enlarged until the shear forces exerted on soluble portion 20 by overlaying formations 16 cause cavity 26 to undergo shear failure and collapse.

In another embodiment of the present invention, the subterranean well 10 is characterized by the presence of well skin (not shown) adjacent soluble portion 20 of subterranean formation 16. As used herein, "well skin" refers to a zone of reduced permeability between a formation and perforated casing of a well which creates an additional pressure drop during production or injection. Well skin formation is generally the result of some damage occurring during the drilling, completion, and/or production operations of a well. Some factors which contribute to skin formation include invasion by mud filtrate or whole mud, cement, partially plugged formations, movable fines and introduced contaminants such as rust and pipe dope. In order for solvent 22 to make sufficient contact with soluble portion 20 of subterranean formation 16 to form cavity 26, the well skin must be removed or penetrated. The well skin is removed by flowing solvent 22 down well bore 12 and out of casing 18 through perforations 24. Solvent 22 contacts the well skin and acts upon it, thereby removing it so that solvent 22 may contact soluble portion 20 of subterranean formation 16. Preferably, solvent 22 comprises an acid such as those noted above, and most preferably the solvent comprises hydrochloric acid.

Once the well skin is removed, solvent 22 is contacted with soluble portion 20, thereby dissolving portions of soluble portion 20 and forming cavity 26. Solvent continues to be flowed down well bore 12 and into soluble portion 20 until cavity 26 has become sufficiently large so that the shear forces exerted on soluble portion 20 by overlaying formations 16 cause cavity 26 to undergo shear failure and collapse.

The preferred forms of the invention described above are to be used as illustration only, and should not be utilized in a limiting sense in interpreting the scope of the present invention. Obvious modifications to the exemplary embodiment, as hereinabove set forth, could be readily made by those skilled in the art without departing from the spirit of the present invention.

The inventor hereby states his intent to rely on the Doctrine of Equivalents to determine and assess the reasonably fair scope of the present invention as it pertains to any method not materially departing from but outside the literal scope of the invention as set forth in the following claims.

What is claimed is:

1. A method of enhancing the productivity of a subterranean well, said well including a string of production casing extending generally downward into a subterranean formation, said casing being perforated at a location adjacent an unfractured soluble portion of the subterranean formation, said method comprising the steps of:

(a) passing a solvent out of the casing through the perforations and into contact with the unfractured soluble portion of the formation;

(b) dissolving a region of the soluble portion to create a cavity in the soluble portion; and (c) increasing the size of the cavity until the subterranean formation proximate the cavity collapses.

2. The method of claim 1, said soluble portion of the subterranean formation comprising a carbonate formation.

3. The method of claim 2, said carbonate formation being formed primarily of a material selected from the group consisting of chalk, aragonite, limestone, dolomite, carbonate cemented sandstones, and combinations thereof.

4. The method of claim 1, said soluble portion of the subterranean formation comprising halite.

5. The method of claim 1, said solvent comprising an acid.

6. The method of claim 5, said solvent comprising less than about 20% of the acid by volume.

7. The method of claim 5, said acid being selected from the group consisting of hydrochloric acid, C1–C12 carboxylic acids, hydrofluoric acid, and mixtures thereof.

8. The method of claim 7, said solvent comprising between about 5–15% of the acid by volume.

9. A well completion method comprising the steps of:

(a) setting a string of production casing in a well bore of a subterranean formation;

(b) perforating the casing adjacent a soluble portion of the subterranean formation;

(c) pumping a solvent down the casing and out of the casing through the perforations;

(d) contacting the solvent with the soluble portion thereby dissolving a region of the soluble portion and creating a cavity in the soluble portion; and (e) causing the cavity to collapse.

10. The method of claim 9, said solvent comprising an acid.

11. The method of claim 10, said acid being selected from the group consisting of hydrochloric acid, C1–C12 carboxylic acids, hydrofluoric acid, and mixtures thereof.

12. The method of claim 11, said solvent comprising between about 5–15% acid by volume.

13. The method of claim 9, the soluble portion of the subterranean formation comprising a carbonate formation.

14. The method of claim 10, said carbonate formation being formed primarily of a material selected from the group consisting of chalk, aragonite, limestone, dolomite, carbonate cemented sandstones, and combinations thereof.

15. The method of claim 9, the soluble portion of the subterranean formation comprising halite.

16. The method of claim 9, steps (d) and (e) being performed without first fracturing the soluble portion with a pad.

17. A method of enhancing the productivity of a subterranean well, said well including a string of production casing extending generally downward into a subterranean formation, said casing being perforated at a location adjacent a soluble portion of the subterranean formation, said method comprising the steps of:

(a) passing an acidic solvent out of the casing through the perforations thereby removing well skin located adjacent the soluble portion;

(b) after skin removal, continuing to pass the acidic solvent out of the casing through the perforations thereby dissolving a region of the soluble portion to create a cavity in the soluble portion; and (c) increasing the size of the cavity until the subterranean formation proximate the cavity collapses.

18. The method of claim 17, said acidic solvent comprising less than 20% of an acid by volume.

19. The method of claim 18, said acid being selected from the group consisting of hydrochloric acid, C1–C12 carboxylic acids, hydrofluoric acid, and mixtures thereof.

20. The method of claim 17, said soluble portion being formed primarily of an unfractured carbonate formation.

* * * * *